(12) United States Patent  
Joseph et al.

(10) Patent No.: US 12,468,083 B2
(45) Date of Patent: Nov. 11, 2025

(54) DISPLAY APPARATUS AND VEHICLE

(71) Applicant: Continental Automotive Technologies GmbH, Hannover (DE)

(72) Inventors: Manrico Joseph, Ober-Ramstadt (DE); Martin Jekel, Bad Nauheim (DE)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/204,240

(22) Filed: May 31, 2023

(65) Prior Publication Data

US 2023/0393327 A1 Dec. 7, 2023

(30) Foreign Application Priority Data

Jun. 1, 2022 (DE) ...................... 10 2022 205 568.3

(51) Int. Cl.
*F21V 8/00* (2006.01)
*B60K 35/22* (2024.01)
*B60K 35/50* (2024.01)
*B60K 35/60* (2024.01)
*B60K 37/00* (2024.01)
*G02F 1/13357* (2006.01)

(52) U.S. Cl.
CPC ............ *G02B 6/0055* (2013.01); *B60K 35/22* (2024.01); *B60K 35/50* (2024.01); *B60K 35/60* (2024.01); *B60K 37/00* (2013.01); *G02B 6/0073* (2013.01); *G02F 1/133605* (2013.01); *B60K 2360/1523* (2024.01); *B60K 2360/23* (2024.01); *B60K 2360/332* (2024.01); *B60K 2360/343* (2024.01)

(58) Field of Classification Search
CPC ............ B60K 35/22; B60K 2360/1523; B60K 2360/23; G02F 1/133605
See application file for complete search history.

(56) References Cited

U.S. PATENT DOCUMENTS

| 8,950,884 | B2 | 2/2015 | Stevens et al. |
| 10,969,628 | B1 | 4/2021 | Zweigle et al. |
| 2004/0095763 | A1 | 5/2004 | Guerrieri et al. |
| 2005/0138852 | A1 | 6/2005 | Yamauchi |
| 2005/0195619 | A1 | 9/2005 | Tseng |

(Continued)

FOREIGN PATENT DOCUMENTS

| CN | 103742840 A | 4/2014 |
| CN | 115016175 A | 9/2022 |

(Continued)

OTHER PUBLICATIONS

Office Action dated Jan. 17, 2023 from corresponding German patent application No. 10 2022 205 568.3.

(Continued)

*Primary Examiner* — Keith G. Delahoussaye
(74) *Attorney, Agent, or Firm* — Buchanan Ingersoll & Rooney PC

(57) ABSTRACT

A display apparatus includes a display panel and a backlight for the display panel. The backlight has a reflector with a plurality of regularly shaped, reflectively embodied cavities which are arranged in a grid. The reflector also has irregularly shaped, reflectively embodied cavities in at least one peripheral region. In addition, the backlight has a plurality of light sources arranged in the cavities.

11 Claims, 7 Drawing Sheets

(56) References Cited

U.S. PATENT DOCUMENTS

| | | | |
|---|---|---|---|
| 2005/0276069 A1 | 12/2005 | Taniguchi et al. | |
| 2006/0138441 A1 | 6/2006 | Kromotis et al. | |
| 2007/0069227 A1 | 3/2007 | Grotsch et al. | |
| 2008/0101062 A1* | 5/2008 | Feng | H10H 20/8506 |
| | | | 257/E33.072 |
| 2008/0111471 A1 | 5/2008 | Blumel et al. | |
| 2010/0033956 A1 | 2/2010 | Kirchberger et al. | |
| 2010/0061087 A1* | 3/2010 | Stevens | G02F 1/133605 |
| | | | 362/97.3 |
| 2010/0141867 A1 | 6/2010 | Ogihara et al. | |
| 2011/0090671 A1* | 4/2011 | Bertram | F21V 9/30 |
| | | | 362/294 |
| 2012/0153317 A1* | 6/2012 | Emerson | G02F 1/133603 |
| | | | 257/89 |
| 2013/0148035 A1* | 6/2013 | Shimizu | G02F 1/133605 |
| | | | 348/739 |
| 2013/0148036 A1* | 6/2013 | Shimizu | H04N 5/64 |
| | | | 348/739 |
| 2013/0301264 A1 | 11/2013 | Van Gompel | |
| 2018/0033991 A1 | 2/2018 | Yamashita | |
| 2018/0372300 A1 | 12/2018 | Ohkawa | |
| 2020/0285117 A1* | 9/2020 | Hashimoto | G02F 1/133603 |
| 2022/0252938 A1 | 8/2022 | Lo | |
| 2022/0308272 A1* | 9/2022 | Hashimoto | G02B 19/0066 |
| 2023/0012552 A1 | 1/2023 | Bando et al. | |
| 2023/0142417 A1 | 5/2023 | Allen et al. | |
| 2024/0045265 A1* | 2/2024 | Streppel | G02F 1/133603 |
| 2024/0103317 A1 | 3/2024 | Yamaguchi et al. | |
| 2024/0125457 A1* | 4/2024 | Beng | H10H 20/8514 |

FOREIGN PATENT DOCUMENTS

| | | |
|---|---|---|
| DE | 10245945 A1 | 4/2004 |
| DE | 10324909 A1 | 1/2005 |
| DE | 102007007353 A1 | 8/2008 |
| DE | 102008031987 A1 | 4/2010 |
| EP | 1496488 A1 | 1/2005 |
| EP | 1586814 A2 | 10/2005 |
| EP | 3276406 A1 | 1/2018 |
| EP | 4063945 A1 | 9/2022 |
| JP | H05139186 A | 6/1993 |
| JP | H08123340 A | 5/1996 |
| JP | 2001085748 A | 3/2001 |
| JP | 2010272448 A | 12/2010 |
| JP | 2016066085 A | 4/2016 |
| JP | 2019197093 A | 11/2019 |
| JP | 2021057505 A | 4/2021 |
| KR | 20170061535 A | 6/2017 |
| WO | 2014166991 A1 | 10/2014 |
| WO | 2021221905 A1 | 11/2021 |

OTHER PUBLICATIONS

Final Office Action dated May 30, 2024, from related U.S. Appl. No. 18/204,215.

Non-Final Office Action dated Dec. 16, 2024, from related U.S. Appl. No. 18/204,215.

Office action dated Jan. 20, 2023 from related German application 10 2022 205 566.7.

Search report dated Oct. 27, 2023 of counterpart EP application 23170170.7.

Office action dated Sep. 21, 2023 from related U.S. Appl. No. 18/204,215.

Search report Dated Nov. 3, 2023 from related EP application 23170179.8.

Non-Final Office Action mailed on Apr. 17, 2025 from related U.S. Appl. No. 18/204,215.

* cited by examiner

DISPLAY APPARATUS AND VEHICLE

CROSS-REFERENCE TO RELATED APPLICATIONS

This application claims priority to German patent application No. DE 10 2022 205 568.3, filed on Jun. 1, 2022, the disclosure of which is hereby incorporated by reference.

TECHNICAL FIELD

The technical field relates to a display apparatus and to a vehicle having such a display apparatus.

BACKGROUND

The number and area of display apparatuses in vehicle are constantly increasing. Display apparatuses can be found on the market for example as an instrument cluster for the driver, as a central display, and also as a front-seat passenger display. Non-self-luminous transmissive display apparatuses require a backlight to present images. The task of the backlight is here to illuminate the display panel used as uniformly as possible over the entire active surface in order to produce a display that is as homogeneous as possible right up to the peripheral region.

Matrix backlights utilize a plurality of light sources arranged in a matrix for light generation. The light from the light sources is steered here in the direction of the display panel by means of a reflector.

For example, US 2005/0276069 A1 describes a liquid crystal display with a diffusion plate or a prism plate arranged between a liquid crystal panel and a plurality of light emission sections. Each light emission section is formed by an optical guide and one or more light-emitting apparatuses. The optical guide has a light reflection surface formed in a substrate and a light transmission surface that is brought into close contact with the light reflection surface.

DE 10 2007 007 353 A1 describes an illumination device having a light emission surface that is able to be assembled in a modular manner from a plurality of radiation reflectors. Radiation reflectors in the shape of honeycombs, scales, triangles or rectangles may be used. Each of the radiation reflectors has a plurality of radiation-reflecting surfaces that are outwardly curved starting from a center in which a light source is arranged.

Free-form display apparatuses are increasingly being used, that is to say display apparatuses whose shape deviates from the classical rectangle. In display apparatuses of this type, one problem that occurs is that the matrix backlight must homogeneously light the entire display region. Therefore, at the freely formed peripheries of the display region, the matrix backlight extends in part beyond the actual display region. To prevent light from emerging outside of the display region, black print on a cover glass of the display apparatus is generally used in such cases. This leads to a conflict of objectives if the display apparatus is intended to be designed with as little periphery as possible.

As such, it is desirable to present an improved display apparatus with a matrix backlight. In addition, other desirable features and characteristics will become apparent from the subsequent summary and detailed description, and the appended claims, taken in conjunction with the accompanying drawings and this background.

SUMMARY

According to one exemplary embodiment, a display apparatus has a display panel and a backlight for the display panel. The backlight includes a reflector with a plurality of regularly shaped, reflectively embodied cavities which are arranged in a grid. The reflector has irregularly shaped, reflectively embodied cavities in at least one peripheral region. A plurality of light sources are arranged in the cavities.

In one exemplary embodiment, a reflector is arranged between the light sources and the display panel and fills the design-related gap between the light sources and the display panel or a further optical component arranged below the display panel. This reflector has a plurality of reflectively embodied cavities, in each of which a light source is arranged. The cavities orient the light emerging from the light sources toward the display panel. The cavities have a regular shape and are arranged in a grid. In the peripheral regions, by contrast, the cavities have at least in part an irregular shape and are approximated to the free form of the display panel. This makes it possible to reduce the installation space required for the backlight.

In one exemplary embodiment, the arrangement of the cavities deviates from the grid in the at least one peripheral region. In addition to using irregularly shaped cavities, it is possible to deviate from the grid in the affected peripheral regions regarding the arrangement of the cavities. This allows an approximation of the backlight to the free form of the display panel that is improved once again.

In one exemplary embodiment, an arrangement of the light sources deviates from the grid in the at least one peripheral region. In the regularly shaped cavities arranged in the grid, the light sources are typically arranged in the center of a cavity, that is to say even the light sources are arranged in the grid. Since the arrangement in the affected peripheral regions deviates from the aforementioned arrangement of the light sources in the grid, it is also possible to achieve homogeneous lighting for irregularly shaped cavities.

In one exemplary embodiment, the reflector has in the at least one peripheral region connected cavities, in which in each case two or more light sources are arranged. Consequently, there are regions in the reflector that are deliberately not fully divided into cavities with exactly one light source. The result of this is that the corresponding regions of the display panel are lit by a plurality of light sources, which ensures compensation for the differently sized cavities and consequently ensures more homogeneous lighting. If a wall between the connected cavities were present, less light would arrive in the associated region of the display panel and the region would appear darker.

In one exemplary embodiment, the light sources arranged in the regularly shaped cavities and the light sources arranged in the irregularly shaped cavities have different luminous intensities. Homogeneous lighting of the display panel can also be achieved in this way. Light sources having a greater luminous intensity are used in irregularly shaped cavities that are larger than the regularly shaped cavities. Accordingly, light sources having a lower luminous intensity are used in irregularly shaped cavities that are smaller than the regularly shaped cavities. The luminous intensity can be adapted by the installation of different types of light sources or by suitable control of the light sources.

In one exemplary embodiment, the regularly shaped cavities have an area in the form of a triangle, rectangle, or hexagon. The regularly shaped cavities consequently form a triangular grid, a rectangular grid, or a hexagonal grid. The reflector can be designed in various ways. The use of triangular, rectangular, or hexagonal cavities makes it possible to form the reflector from a gapless matrix of cavities.

In one exemplary embodiment, walls of the cavities are rounded and the cavities are designed to reflect the light emitted by the light sources toward the display panel. By rounding the cavities, the emitted light can be reflected toward the display panel in a more targeted manner.

In one exemplary embodiment, the light sources are side-emitting light-emitting diodes. The use of side-emitting light-emitting diodes has the advantage that the formation of light spots in the backlight is prevented. This ensures illumination of the display panel that appears particularly homogeneous.

In one exemplary embodiment, the side-emitting light-emitting diodes emit light on all sides. This ensures an additional increase in the homogeneity of the lighting of the display panel.

A display apparatus as described herein may be used in a vehicle. The vehicle can be, for example, a motor vehicle, such as an automobile, but alternatively also an aircraft, a rail vehicle, or a watercraft.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

For a better understanding of the principles of the disclosure, various embodiments will be explained in more detail below with reference to the figures. The same reference signs are used in the figures for identical or functionally identical elements and are not necessarily described again for each figure. It is understood that the invention is not limited to the illustrated embodiments and that the described features can also be combined or modified without departing from the scope of protection of the invention as defined in the appended claims.

Figure 1:
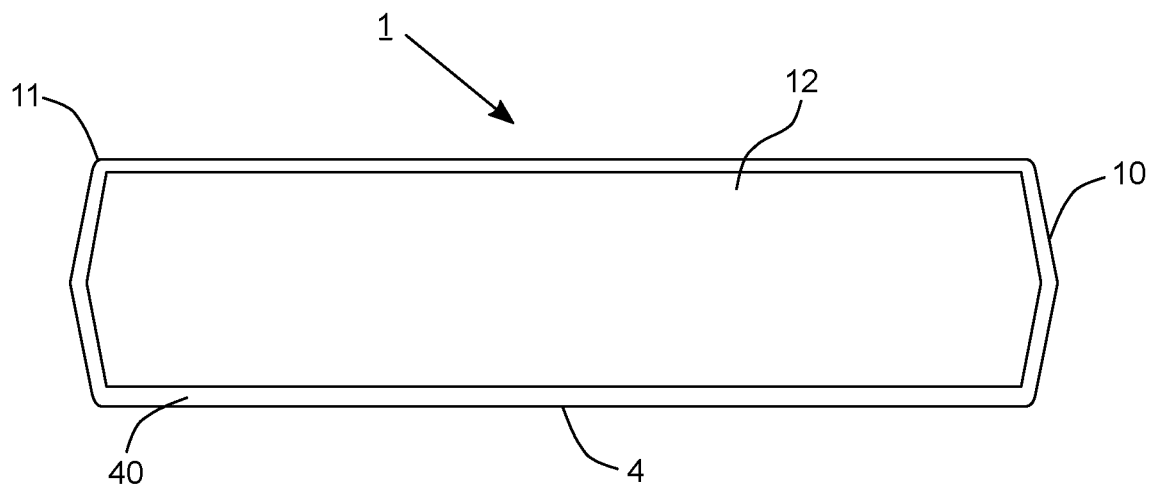
FIG. 1 schematically shows a free-form display apparatus.

FIG. 1 schematically shows a free-form display apparatus 1. The display apparatus 1 does not have a conventional rectangular shape but has inclined sides 10 and rounded corners 11. To prevent light from a backlight from emerging outside the display region 12, a cover glass 4 of the display apparatus 1 is provided with black print 40.

Figure 2:
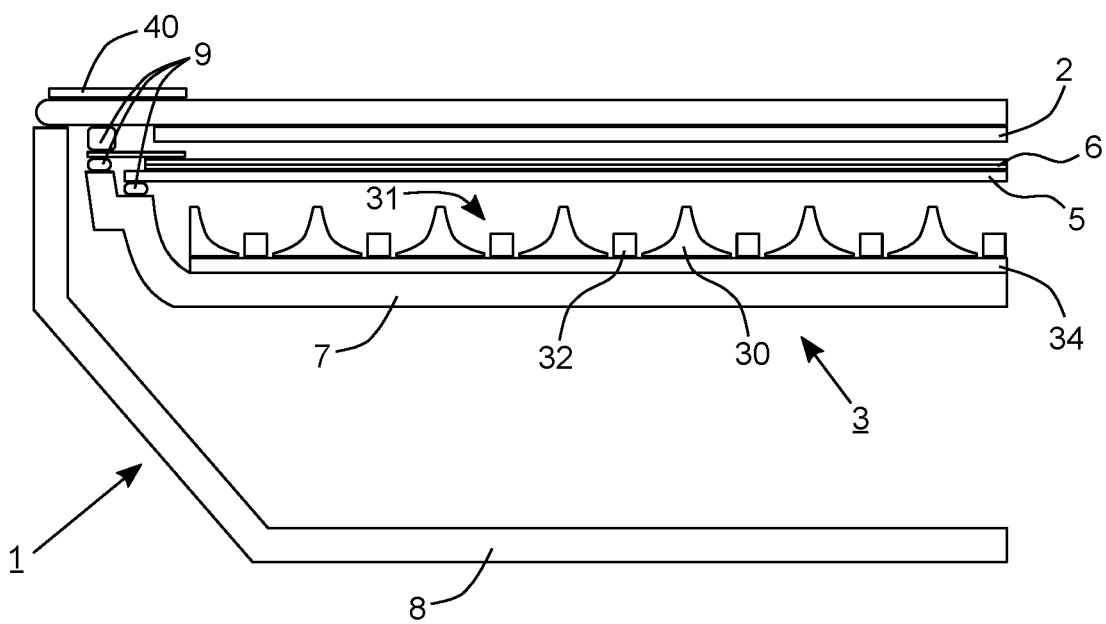
FIG. 2 schematically shows a cross section through the display apparatus from FIG. 1.

FIG. 2 schematically shows a cross section through the display apparatus 1 from FIG. 1. The display apparatus 1 has a display panel 2, which is adhesively bonded to the cover glass 4. The cover glass 4 closes off a housing 8 of the display apparatus 1 with respect to the environment and is provided with black print 40. In a further housing 7, a backlight 3 for the display panel 2 is arranged. The backlight 3 has a reflector 30 with a plurality of cavities 31. In each case one light source 32, typically a light-emitting diode, is arranged in the cavities 31. The light sources 32 are arranged on a circuit board 34, which can be adhesively bonded to the housing 7 of the backlight 3. In the illustrated example, an optical plate 5 with a film stack 6 that is arranged thereon is located between the backlight 3 and the display panel 2. The films of the optical film stack 6 are intended to scatter, collect or direct the light from the reflector 30 in a way such that the requirements regarding the solid angles of the backlight 3 are met. Typical films for directing light are brightness enhancement films (BEF) and light control films (LCF). The optical plate 5 is a transparent plate that ensures the optical path length between the optical film stack 6 and the light sources 32. The cover glass 4, the optical plate 5, and the housing 7 of the backlight 3 are connected to one another by suitable connection elements 9, for example adhesive bonds.

Figure 3:
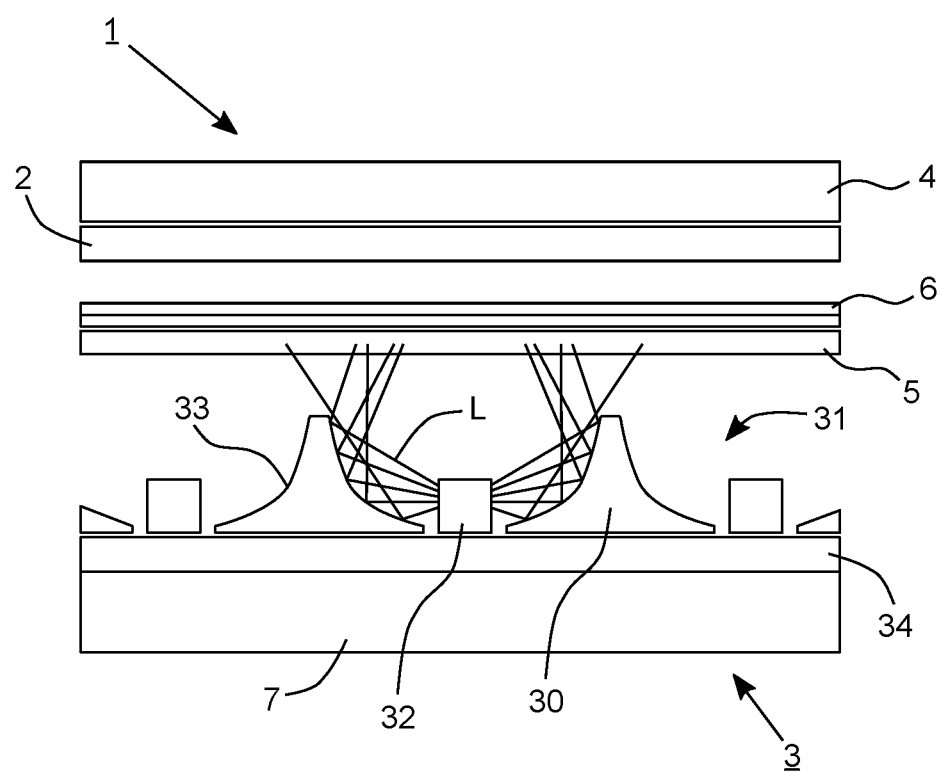
FIG. 3 schematically shows a detailed view of the display apparatus.

FIG. 3 schematically shows a detailed view of the display apparatus 1. It shows the cover glass 4 with the display panel 2, the optical plate 5 with the film stack 6, and the backlight 3 with the housing 7, the circuit board 34 with the light sources 32 arranged thereon and the reflector 30. The light sources 32 in this case are side-emitting light-emitting diodes, which emit light L on all sides. The reflectively configured walls 33 of the cavities 31 of the reflector 30 have a rounded design and orient the light L emerging from the light sources 32 toward the display panel 2. In one exemplary configuration, the entire construction height of the display apparatus 1 lies in the region of ~13.3 mm. The height of the reflector 30 can be ~3.72 mm, the width of the walls 33 at their widest point can be ~6.13 mm. The distance between the film stack 6 and the display panel 2 is ~1.31 mm; the distance between the reflector 30 and the optical plate 5 is ~1.05 mm. The distance between the light sources 32 can be ~9.13 mm, for example.

Figure 4:
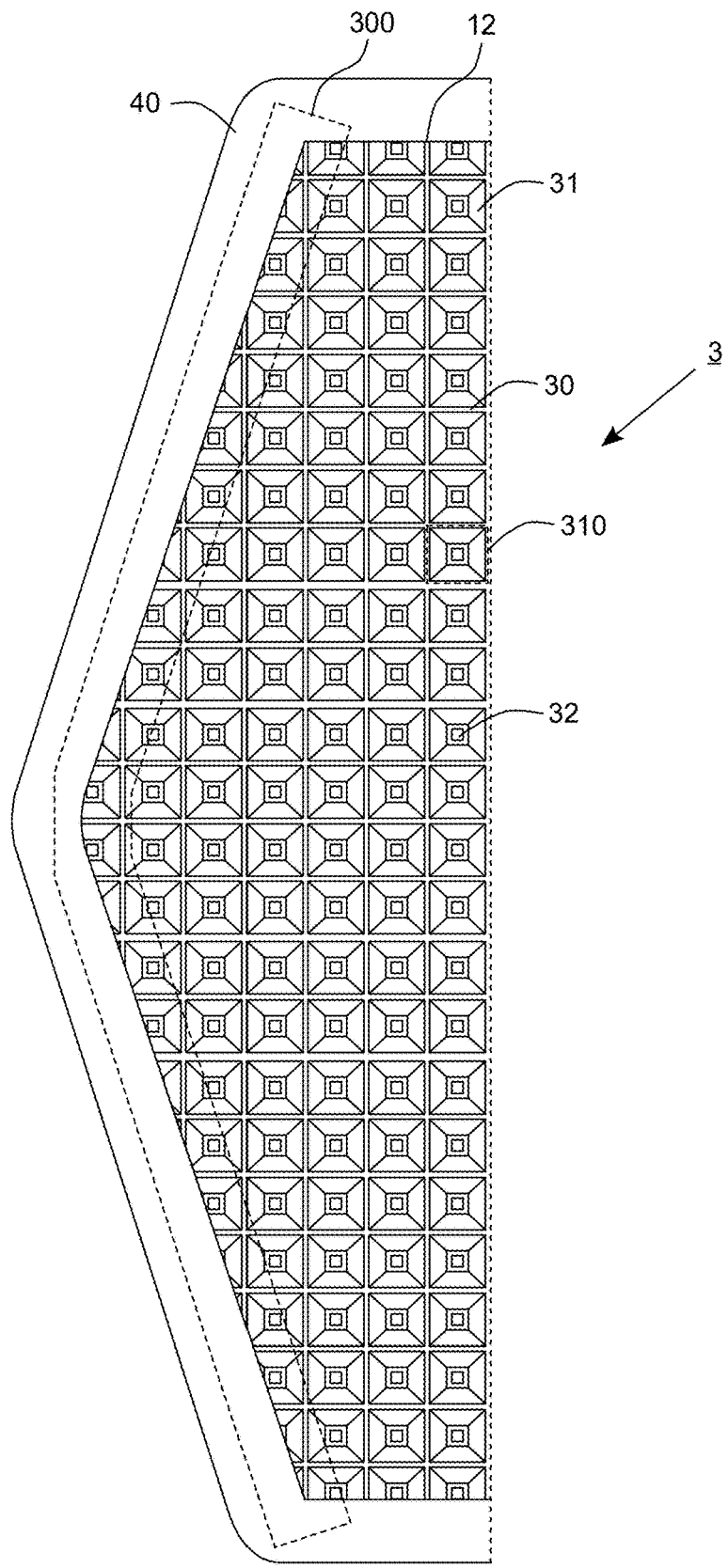
FIG. 4 schematically shows a known backlight.

FIG. 4 schematically shows a known backlight 3 for the display apparatus 1 from FIG. 1. The backlight 3 has a reflector 30 with a plurality of regularly shaped, reflectively embodied cavities 31 arranged in a grid. In each case one light source 32 is arranged in the cavities 31. In the example illustrated, the cavities 31 have a rectangular area 310 and are arranged in a rectangular grid. The cavities 31 in some instances extend beyond the actual display region 12 in the peripheral regions 300 of the backlight 3. Light is prevented from emerging in these regions by black print 40, which is likewise illustrated for clarification purposes in FIG. 4, even though it is not part of the backlight 3.

Figure 5:
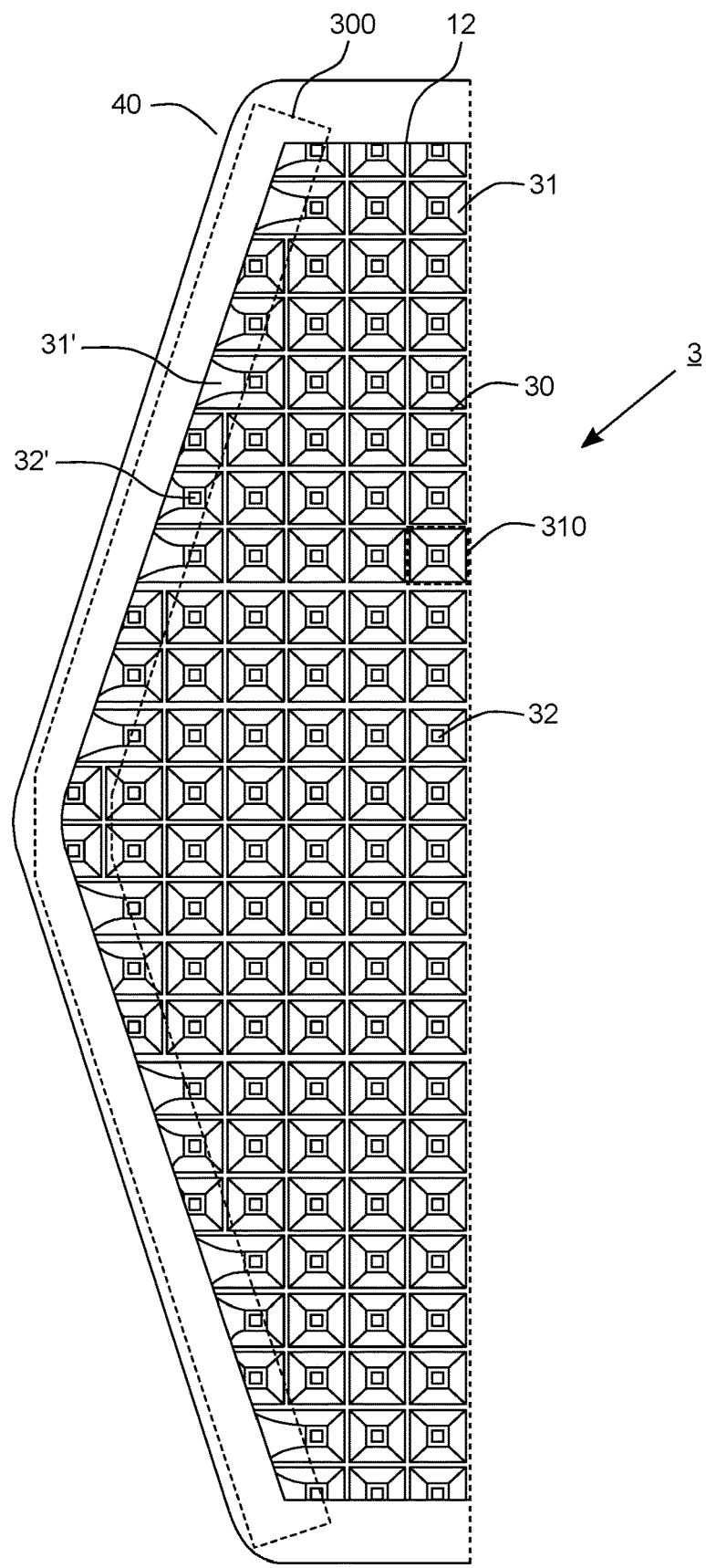
FIG. 5 schematically shows a first exemplary embodiment of a backlight.
Figure 6:
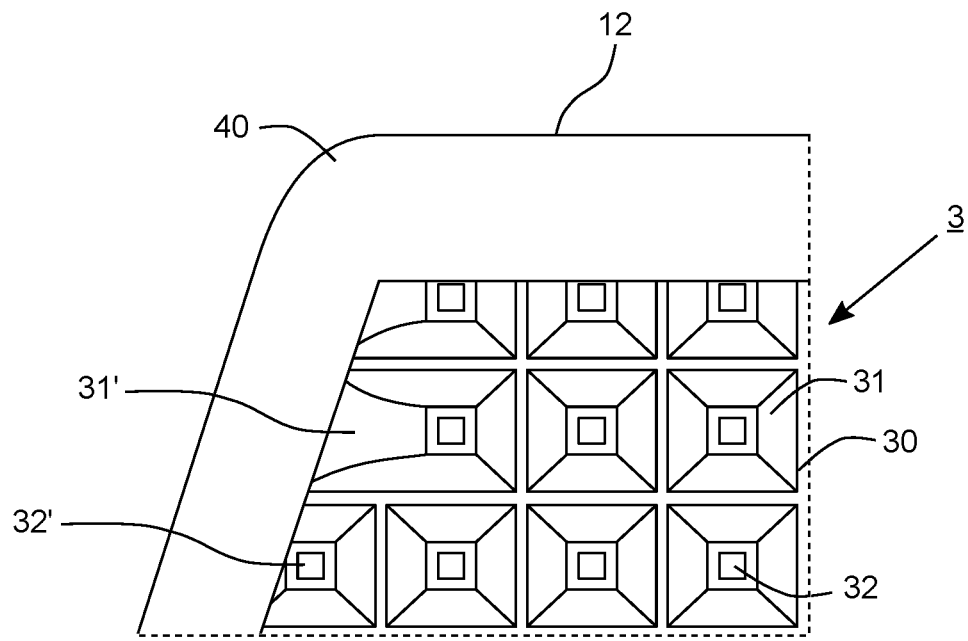
FIG. 6 schematically shows a detailed view of the backlight from FIG. 5.

FIG. 5 schematically shows a first embodiment of a backlight 3 as presented in this disclosure. FIG. 6 schematically shows a detailed view of the backlight 3. In comparison with the known embodiment from FIG. 4, the backlight 3 according to the disclosure differs in that the cavities 31' of the reflector 30 have a deviating design in the peripheral regions 300. The cavities 31' in the peripheral regions 300 are at least in part irregularly shaped and deviate in size from the regularly shaped cavities 31. This makes it possible to reduce the installation space required for the backlight 3 because the cavities 31' in the peripheral region 300 extend beyond the actual display region 12 to a lesser extent, and the black print 40 can therefore be narrower. The irregularly shaped cavities 31' may be larger or smaller than the regularly shaped cavities 31. As is clear in FIG. 5 and FIG. 6, the light sources 32, 32' are furthermore arranged in a grid. In order to achieve homogeneous lighting of the display panel despite the cavities 31, 31' having different sizes, the light sources 32 in the regularly shaped cavities 31 and the light sources 32' in the irregularly shaped cavities 31' can have different luminous intensities. In FIG. 5 and FIG. 6, the regularly shaped cavities 31 have a rectangular area 310. However, the area 310 may also be shaped differently, for example in the shape of a triangle or a hexagon.

Figure 7:
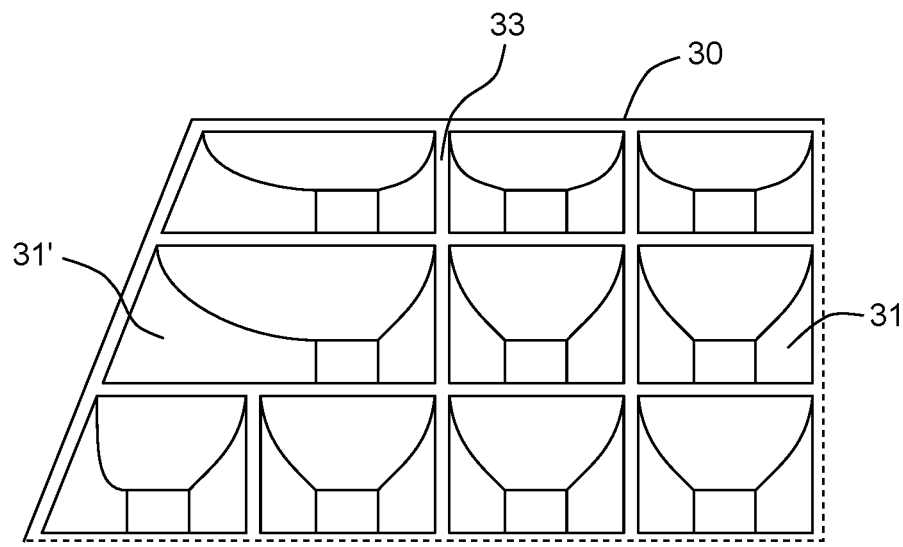
FIG. 7 schematically shows a detailed view of a reflector of the backlight from FIG. 5.

FIG. 7 schematically shows a detailed view of a reflector 30 of the backlight from FIG. 5. It is clear to see that the configuration of the cavities 31' is approximated to the free form of the display panel. In addition, the figure clearly shows a rounded shape of the walls 33 of the cavities 31, 31'. By rounding the cavities, the emitted light can be reflected by the walls 33 toward the display panel in a more targeted manner.

Figure 8:
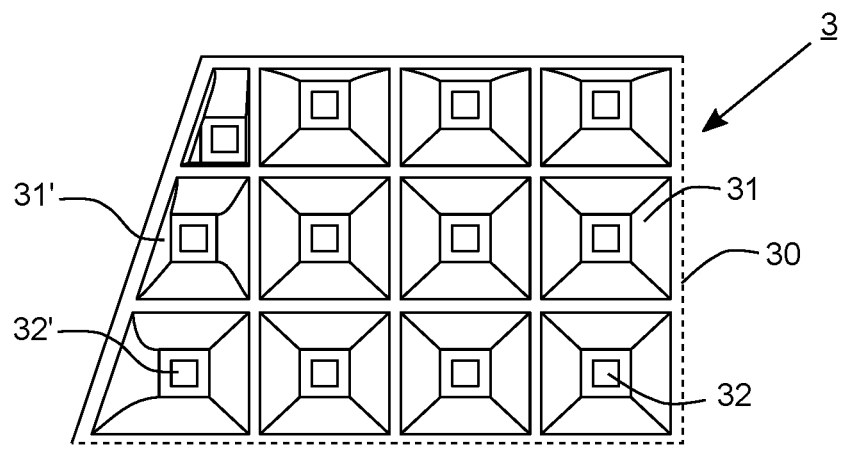
FIG. 8 schematically shows a detailed view of a second exemplary embodiment of the backlight.

FIG. 8 schematically shows a detailed view of a second embodiment of the backlight 3. In this embodiment, cavities 31' which are at least in part shaped irregularly and deviate in size from the regularly shaped cavities 31 are also provided in the peripheral region. The black print is not shown in this figure in order to allow the different shapes of the irregularly shaped cavities 31' to be more easily visible. It is clear to see that the irregularly shaped cavities 31' are in part larger and in part smaller than the regularly shaped cavities 31. In addition, the arrangement of the light sources 32' in the peripheral region also deviates from the grid in this embodiment. In this way, particularly homogeneous lighting can be attained even with irregularly shaped cavities 31'.

Figure 9:
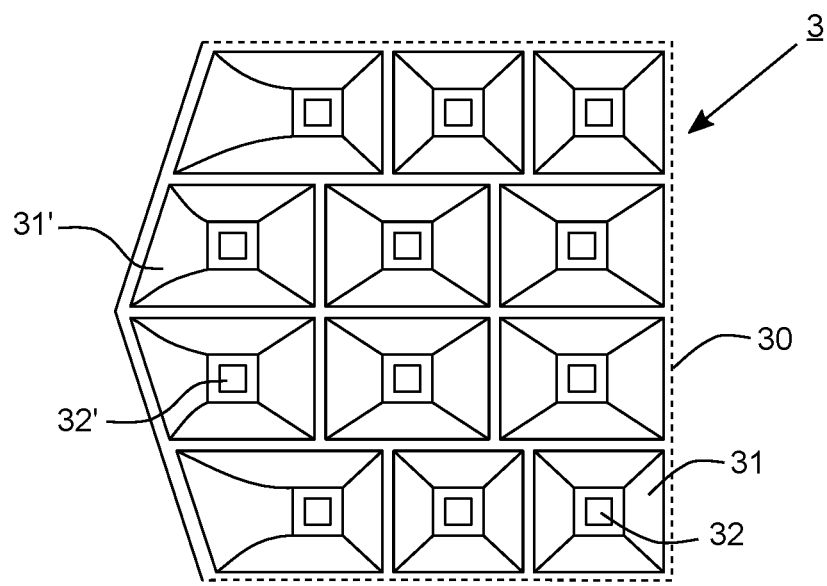
FIG. 9 schematically shows a detailed view of a third exemplary embodiment of the backlight.

FIG. 9 schematically shows a detailed view of a third embodiment of the backlight 3. In this embodiment, cavities 31' which are at least in part shaped irregularly and deviate in size from the regularly shaped cavities 31 are also provided in the peripheral region. The irregularly shaped cavities 31' may be larger or smaller than the regularly shaped cavities 31. In this embodiment, both the arrangement of the light sources 32' in the peripheral region and the arrangement of the cavities 31, 31' in the peripheral region also deviate from the grid. This allows an approximation of the backlight 3 to the free form of the display panel that is improved once again.

Figure 10:
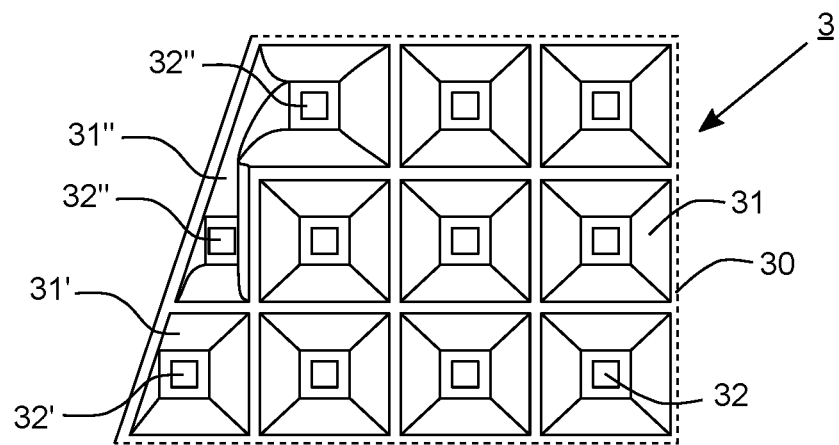
FIG. 10 schematically shows a detailed view of a fourth exemplary embodiment of the backlight.

FIG. 10 schematically shows a detailed view of a fourth embodiment of the backlight 3. In this embodiment, cavities 31' which are at least in part shaped irregularly and deviate in size from the regularly shaped cavities 31 are also provided in the peripheral region. The irregularly shaped cavities 31' may be larger or smaller than the regularly shaped cavities 31. In addition, cavities 31" are provided which are connected in the peripheral region and in which two or more light sources 32" are arranged in each case. Consequently, there are regions in the reflector 30 that are deliberately not fully divided into cavities 31, 31' with exactly one light source 32, 32'. The result of this is that the corresponding regions of the display panel are lit by a plurality of light sources 32", which ensures compensation for the differently sized cavities 31" and consequently ensures more homogeneous lighting.

Figure 11:
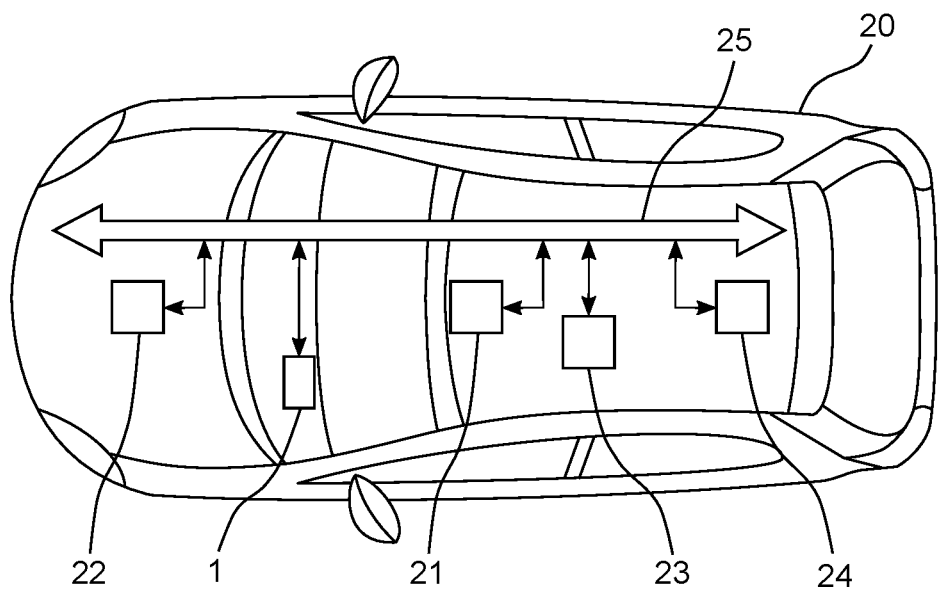
FIG. 11 schematically shows a vehicle that utilizes the display apparatus.

FIG. 11 schematically shows a vehicle 20 that utilizes the display apparatus 1. The vehicle 20 is a motor vehicle in this example. The motor vehicle has a display apparatus 1 which is disposed in a dashboard. Data on the vehicle's environment can be acquired by a sensor system 21. The sensor system 21 may include surroundings recognition sensors, for example ultrasonic sensors, laser scanners, radar sensors, lidar sensors, or cameras. The information acquired by the sensor system 21 can be used to generate content to be displayed for the display apparatus 1. Further constituent parts of the motor vehicle in this example are a navigation system 22, by which positional information can be provided, and also a data transmission unit 23. A connection to a back-end, for example for receiving updated software for components of the motor vehicle, may, for example, be established by the data transmission unit 23. A memory 24 is present for storing data. Data is exchanged between the various components of the motor vehicle via a network 25.

The present disclosure has been described herein in an illustrative manner, and it is to be understood that the terminology which has been used is intended to be in the nature of words of description rather than of limitation. Obviously, many modifications and variations of the disclosure are possible in light of the above teachings. The disclosure may be practiced otherwise than as specifically described within the scope of the appended claims.

What is claimed is:

1. A display apparatus comprising:
a display panel and
a backlight for the display panel, wherein the backlight includes
a reflector with a plurality of regularly shaped, reflectively embodied cavities which are arranged in a grid, wherein the reflector has irregularly shaped, reflectively embodied cavities in at least one peripheral region,
at least one light source arranged in each of the cavities, wherein the at least one light source is a side-emitting light-emitting diode, and
an optical plate disposed between the display panel and the reflector,
wherein walls of the cavities are rounded and the cavities are configured to reflect light emitted by the at least one light source toward the display panel, and
wherein an upper extent of the reflector is spaced apart from a lower face of the optical plate by a predetermined distance.

2. The display apparatus as claimed in claim 1, wherein the arrangement of the cavities in the at least one peripheral region deviates from the grid.

3. The display apparatus as claimed in claim 1, wherein an arrangement of the at least one light source in the at least one peripheral region deviates in an asymmetrical manner from the at least one light source disposed in the grid which is in a region other than the at least one peripheral region.

4. The display apparatus as claimed in claim 1, wherein the reflector has in the at least one peripheral region individual cavities which are not fully divided to form a connected cavity, in which two or more light sources are arranged.

5. The display apparatus as claimed in claim 1, wherein the at least one light source arranged in the regularly shaped cavities and the at least one light source arranged in the irregularly shaped cavities have different luminous intensities.

6. The display apparatus as claimed in claim 1, wherein the regularly shaped cavities have an area in the form of a triangle, rectangle, or hexagon.

7. The display apparatus as claimed in claim 1, wherein the at least one side-emitting light-emitting diode emits light on all sides.

8. A vehicle with a display apparatus, the display apparatus comprising:

a display panel and a backlight for the display panel, wherein the backlight includes a reflector with a plurality of regularly shaped, reflectively embodied cavities which are arranged in a grid, wherein the reflector has irregularly shaped, reflectively embodied cavities in at least one peripheral region, at least one light source arranged in each of the cavities, wherein the at least one light source is a side-emitting light-emitting diode, and an optical plate disposed between the display panel and the reflector wherein walls of the cavities are rounded and the cavities are configured to reflect the light emitted by the light sources toward the display panel, and wherein an upper extent of the reflector is spaced apart from a lower face of the optical plate by a predetermined distance.

9. The display apparatus as claimed in claim 1, wherein the irregularly shaped cavities have one side having a regular shape, and the remaining sides have an irregular shape.

10. The display apparatus as claimed in claim 1, wherein a predetermined number of light sources are arranged in the regularly shaped cavities and a same number of light sources are arranged in the irregularly shaped cavities, the light sources in the regularly shaped cavities have a different luminous intensity from the light sources in the irregularly shaped cavities.

11. The display apparatus as claimed in claim 1, wherein rays of the at least one light source are reflected by the cavity, and wherein at least a portion of the reflected rays extend beyond a vertical extent of the respective cavity and impinge on the optical plate.

* * * * *